United States Patent [19]

Hook et al.

[11] 4,237,429

[45] Dec. 2, 1980

[54] TRANSVERSE MIXING HYPERSONIC WEDGE NOZZLE CHEMICAL LASER

[75] Inventors: Dale L. Hook; John Waypa, Jr., both of Rancho Palos Verdes, Calif.

[73] Assignee: TRW Inc., Redondo Beach, Calif.

[21] Appl. No.: 958,919

[22] Filed: Nov. 8, 1978

[51] Int. Cl.³ .............................................. H01S 3/00
[52] U.S. Cl. ............................ 331/94.5 G; 331/94.5 P
[58] Field of Search ..................... 331/94.5 G, 94.5 D, 331/94.5 P

[56] References Cited

U.S. PATENT DOCUMENTS

| 3,671,882 | 6/1972 | Cool | 331/94.5 G |
| 3,688,215 | 8/1972 | Spencer et al. | 331/94.5 G |
| 4,048,586 | 9/1977 | Witte et al. | 331/94.5 D |

Primary Examiner—James W. Davie
Attorney, Agent, or Firm—Donald R. Nyhagen; John J. Connors

[57] ABSTRACT

The reactants in a chemical laser are mixed to effect a lasing action by expanding one reactant through a relatively large primary nozzle in such a way as to form an expanding reactant flow field whose free expansion is essentially two dimensional in character and occurs predominantly in directions parallel to a given plane (expansion plane) parallel to the flow path of the flow field, and injecting the other reactant into this expanding flow field in such a way that mixing of the reactants occurs by predominantly molecular diffusion of the second reactant into the first reactant flow field in directions transverse to the flow field expansion plane.

23 Claims, 6 Drawing Figures

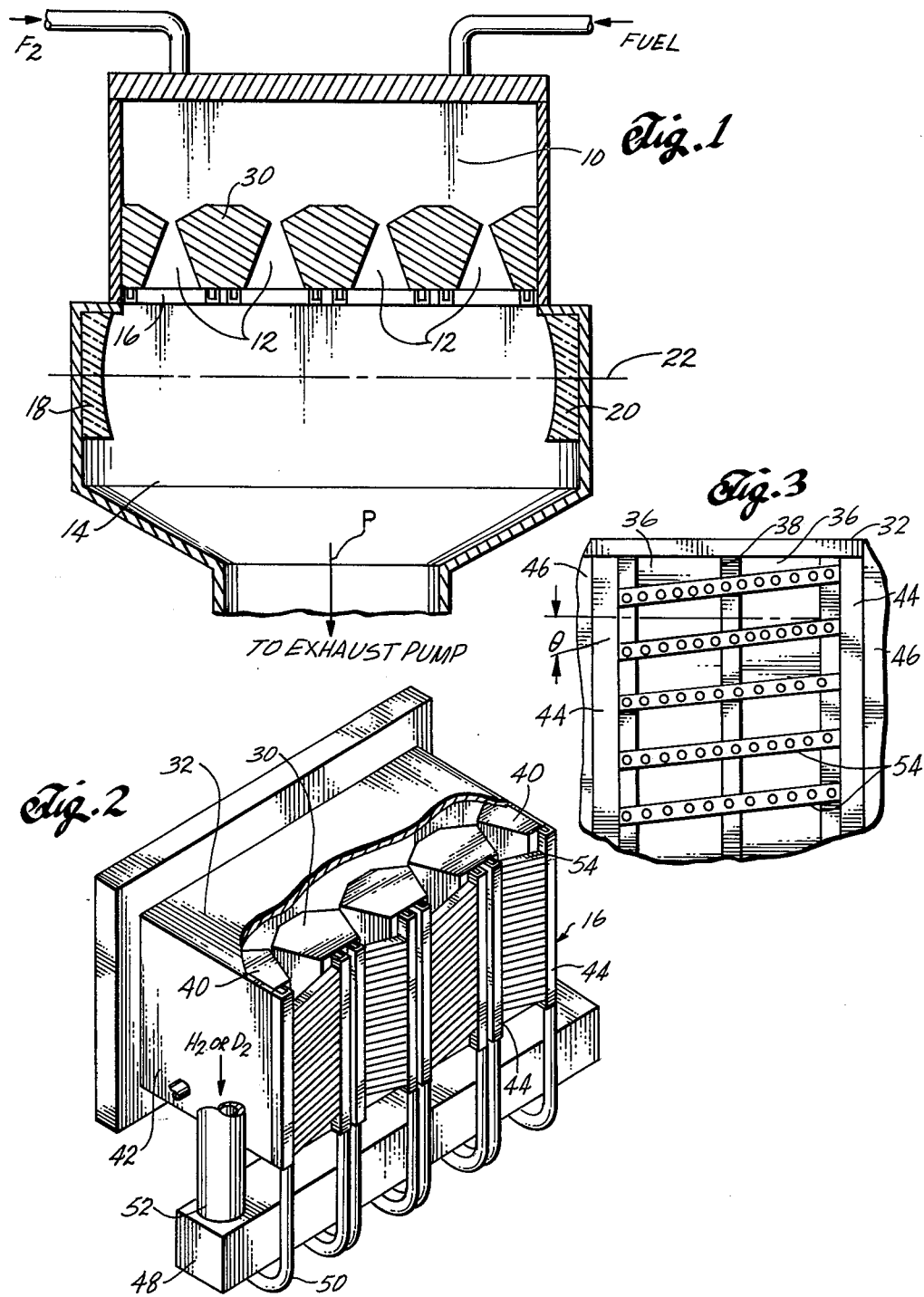

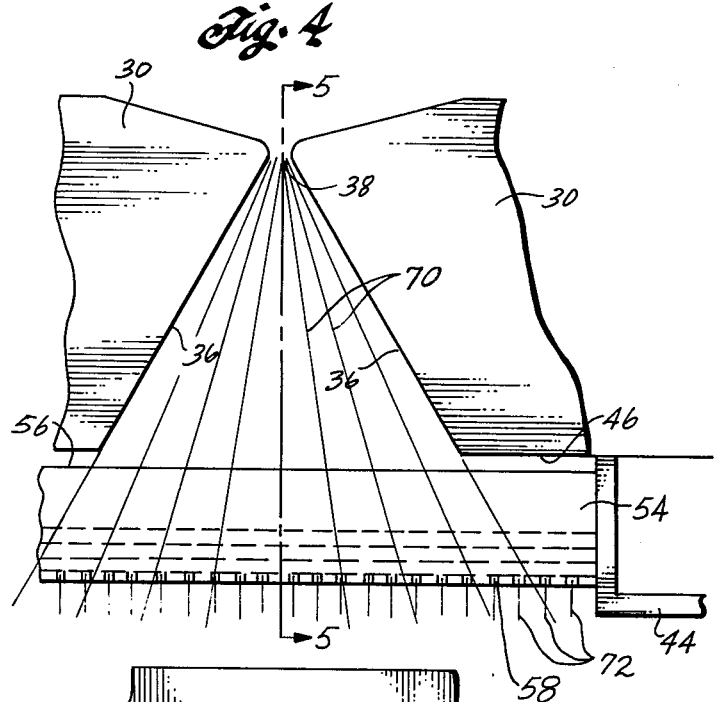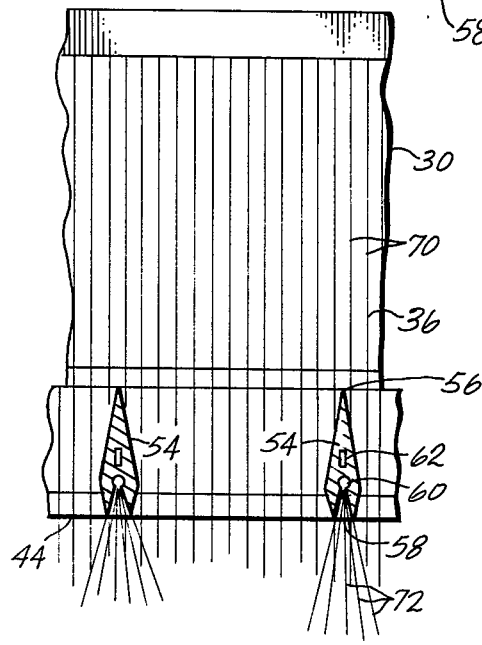

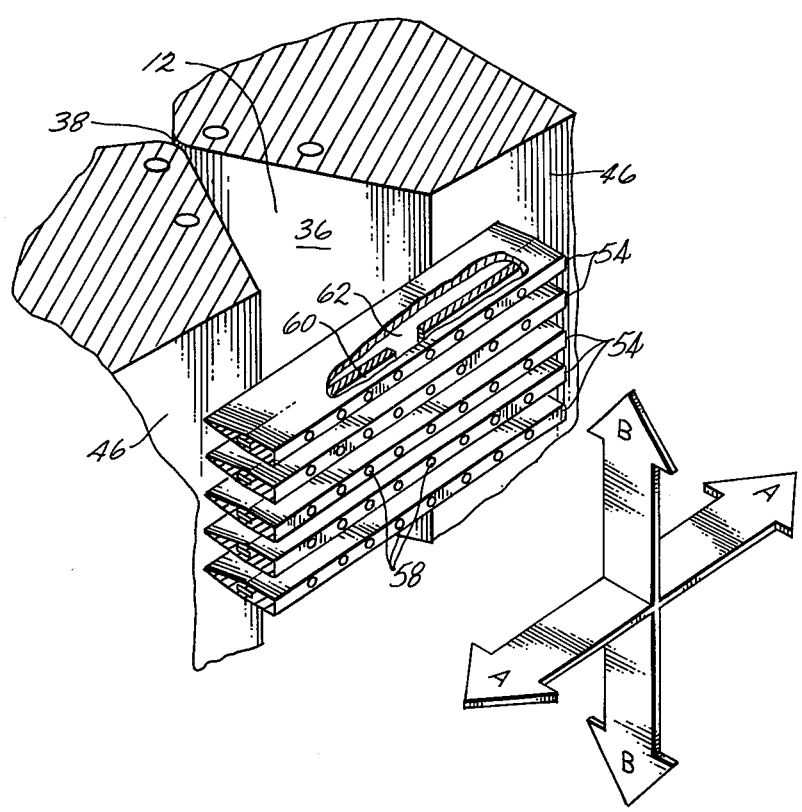

TRANSVERSE MIXING HYPERSONIC WEDGE NOZZLE CHEMICAL LASER

FIELD OF THE INVENTION

This invention relates to chemical lasers and, more particularly, to improved apparatus for providing more efficient lasing action in a chemical laser.

BACKGROUND OF THE INVENTION

The use of a chemical reaction to produce a continuous wave chemically pumped lasing action is well-known. The basic concept of such a chemical laser is described, for example, in U.S. Pat. No. 3,688,215. As therein described, the continuous wave chemical laser includes a plenum in which gases are heated by combustion or other means to produce a primary reactant gas containing dissociated atoms of a reactant element such as fluorine mixed with diluent gases, such as helium or nitrogen. These gases are expanded through a multiplicity of small supersonic primary or oxidizer nozzles to a high velocity and low pressure. The gases exit the nozzles into an optical cavity. A secondary reactant gas, such as hydrogen or deuterium, is injected into the cavity through secondary or cavity fuel nozzles located between the exit ends of the primary nozzles and mixed with the free jets of the primary reactant gas emerging from the primary nozzles and containing atomic fluorine. The resulting reaction between the hydrogen (or deuterium) and fluorine produces vibrationally excited HF or DF molecules. These molecules are unstable at the low temperature and pressure condition in the cavity and return to a lower vibrational state by releasing photons. Mirrors spaced in the cavity along an axis transverse to the flow field amplify the lasing action from the released photons within the optical cavity formed by the mirrors. The lasing action is of the continuous wave type which is pumped by the high energy vibrationally excited molecules formed in the optical cavity.

The lasing action depends on producing vibrationally excited states in the HF or DF molecules. This in turn requires that the molecules be formed under conditions of low temperature and pressure. As the pressure and temperature increase, the number of vibrationally excited molecules decreases and more energy goes into translational movement of the molecules, defeating the lasing action. To obtain low temperature and pressure in the optical cavity, the reactant gas is expanded through the primary supersonic nozzles to a Mach number greater than unity. Laser devices of the type described in the above-identified patent required large amounts of diluent gases in the flow to prevent excessive temperature increases. If the diluent gas is removed from the conventional chemical laser flow, large temperature rises occur as a result of the heat released by the exothermic reactions in the optical laser cavity. This temperature rise not only reduces the lasing action, but drives the Mach number of the flow to unity, thereby making recovery of stagnation pressure of the gas flow downstream of the laser cavity impossible. This phenomena is known as thermal "choking." The large amount of diluent gas requires large storage tankage and reduces the efficiency of the laser in terms of output light energy per lb. of input gases.

The use of conventional small scale primary or oxidizer nozzles as described in the above-identified patent leads to viscous flow through the nozzles resulting in a loss of total pressure, a decrease in gas exit velocity, and an increase in the gas exit temperature, also leading to a degradation in the lasing action.

It has been shown that this problem of viscous flow in small primary nozzles may be alleviated or eliminated while still maintaining high Mach numbers in the emerging gases, by replacing such nozzles by a single large primary nozzle and introducing the secondary reactant into the expanding primary reactant flow field emerging from the primary nozzle through a plurality of wedge-shaped reactant injection tubes traversing the opening of the single large nozzle. The thermal "choking" effect, described above, has been minimized by allowing the reactant gas to continue to expand after it emerges from the nozzle. However, in these prior art nozzle arrangements, expansion of the primary flow field occurs through so-called two-dimensional nozzle(s) whereby such expansion is essentially two dimensional in character and occurs predominantly in directions parallel to a given plane, referred to herein as the flow field expansion plane, parallel to the flow path of the flow field, and mixing of the primary and secondary reactants is accomplished by injecting the secondary reactant into the flow field through rows of secondary nozzle openings oriented normal to this expansion plane in such a way that molecular diffusion of the secondary reactant to effect reactant mixing occurs in directions parallel to this plane. Expansion of the flow field thus occurs in the same directions as the molecular diffusion of the secondary reactant to effect reactant mixing. Mixing of the reactants is thereby retarded and occurs along a substantial length of the primary flow field path. The concentration of excited molecules within the optical cavity and hence also the efficiency of the lasing action are correspondingly reduced. Thus, even though the total number of molecules in the vibrationally excited state may be sufficient to maintain a lasing action, the concentration of such molecules within the optical cavity is reduced, with a net loss of efficiency in the lasing action.

SUMMARY OF THE INVENTION

The present invention is directed to an improved design of a chemically pumped laser of the type described above which provides substantially higher efficiency in the production of laser power output. The higher efficiency is achieved by providing rapid efficient mixing of the primary and secondary reactants while at the same time reducing viscous losses and providing flow expansion beyond the primary nozzle which results in higher Mach number with attendant decreased static temperature and pressure. This is accomplished, in brief, by (a) expanding the primary reactant through at least one and generally several relatively large two-dimensional primary nozzles in such a way as to provide, downstream of each nozzle, an expanding primary reactant flow field whose expansion is essentially two dimensional in character and occurs substantially entirely in directions parallel to a given plane (expansion plane) parallel to the flow path of the flow field and (b) injecting the secondary reactant into this flow field in such a way that reactant mixing occurs predominantly by diffusion of the secondary reactant into the expanding primary reactant flow field in transverse directions of the flow field expansion plane. Expansion of the flow field thus produces substantially no expansion of its primary reactant in the directions of molecular diffusion of the secondary reactant into the flow field. Mixing of the reactants is thereby accelerated so as to occur in a significantly shorter distance along the flow field path, whereby the concentration of excited molecules within the optical cavity and hence also the efficiency of the lasing action are correspondingly increased.

The two-dimensional primary nozzle for producing this two-dimensional-expansion flow field is characterized by a divergent nozzle passage bounded essentially by only two opposing divergent walls, whereby expansion of the primary reactant flow field emerging from the nozzle occurs predominantly parallel to a plane, sometimes referred to as the nozzle divergence plane, normal to the divergent sidewalls and parallel to the flow direction through the nozzle. This plane obviously parallels the flow field expansion plane referred to above and will be hereafter referred to as the nozzle or flow field expansion plane. A multiplicity of secondary hypersonic injection vanes extends across the exit end of the primary nozzle in parallel relation to one another and to the primary nozzle expansion plane, whereby the expanding flow field emerging from the primary nozzle passes between the vanes. Each such vane has a plurality of closely spaced orifice openings along its downstream edge through which the secondary reactant is discharged into the expanding primary reactant flow field downstream of the secondary vanes. The secondary reactant is discharged from the trailing edge of each secondary hypersonic vane in a manner to effect molecular diffusion of the secondary reactant into the expanding primary reactant flow field in directions transverse to the expansion plane. In this manner, mixing of the primary and secondary reactants and expansion of the primary reactant flow field occur approximately ninety degrees with respect to one another. This enhances the gas dynamic flow expansion effects and reactant mixing actions which result in higher Mach numbers and lower temperature and pressure levels while at the same time minimizing the primary reactant flow path length required to achieve complete mixing of the reactants. As mentioned, this reduction of the mixing flow path length increases the concentration of vibrationally excited molecules within the optical cavity and hence lasing efficiency.

BRIEF DESCRIPTION OF THE DRAWINGS

For a more complete understanding of the invention, reference should be made to the accompanying drawings, wherein:

FIG. 1 is a top view of a laser device incorporating the present invention;

FIG. 2 is a perspective view, partly cut away, of a preferred embodiment of the present invention;

FIG. 3 is a detailed partial front view of one of the primary nozzles and associated injection vanes;

FIG. 4 is a detailed top view of one of the primary nozzles;

FIG. 5 is a detailed sectional view taken substantially on the line 5—5 of FIG. 4; and FIG. 6 is an enlarged fragmentary perspective view of one of the primary nozzles and associated secondary injection vanes.

DETAILED DESCRIPTION

Referring to FIG. 1 in detail, the numeral 10 indicates generally a plenum chamber in which gases are heated by combustion or other suitable means to produce a primary reactant gas containing an atomic or free radical species of a first reactant. For example, fluorine gas $F_2$ is heated by combustion of a fuel or other suitable heating means, such as an electrical arc, to a sufficiently high temperature to ensure dissociation of the fluorine gas molecules to give F-atoms. Diluent gases, such as helium or nitrogen, may also be added and heated in the plenum chamber 10 and released from the chamber with the dissociated fluorine atoms through a series of two-dimensional supersonic primary nozzles 12 arranged side by side with their expansion planes parallel to one another, such that the nozzles actually have a common expansion plane. These nozzles expand the primary reactant gases to a high Mach number, e.g., five, resulting in a low pressure and temperature condition in the emerging gas stream.

The primary reactant gases exit the primary nozzles 12 and continue to expand as free jets into an optical cavity 14 after passing through a secondary reactant injection system 16 including sets of secondary hypersonic injection vanes 54 extending across the downstream opening of the respective primary nozzles. Each secondary vane, as hereinafter described in detail, functions to inject a secondary reactant, such as hydrogen or deuterium gas, into the optical cavity to mix by molecular diffusion with the expanding primary reactant flow fields emerging from the primary nozzles 12. The reaction between the primary and secondary reactants, i.e. between the hydrogen or deuterium and the fluorine atoms, initiates the chemical pumping mechanism which yields vibrationally excited HF or DF molecules. Optical energy is then extracted from this media within the optical cavity 14 which includes a pair of opposing mirrors 18 and 20 spaced along an optical axis 22 transverse to the flow path P of the primary reactant flow stream or flow field through the cavity. While the optical axis preferably parallels the common expansion plane of the primary nozzles, as shown the optical axis may be rotated from this position if desired. Effluent gases are continually pumped from the optical cavity by a suitable exhaust pump (not shown) which operates to maintain the optical cavity at sub-atmospheric pressure.

The supersonic primary nozzles 12 are formed by a plurality of posts or columns 30 extending between end walls 32 of the plenum chamber 10. As shown in detail in FIG. 4, adjacent columns 30 have confronting diverging surfaces 36 forming and bounding two sides of the divergent supersonic portion of each nozzle 12 (i.e. divergent nozzle passage). The inner edges of the surfaces 36 of the columns 30 are rounded to form a throat, indicated at 38, through which the primary reactant gas emerges from the plenum chamber 10. Adjacent primary nozzles are spaced apart by the width of the front surface 46 of the intervening column 30. Thus, adjacent nozzles are spaced apart by a distance which is substantial relative to the diverging width of the nozzle, providing space downstream of these nozzles for continued expansion of the emerging primary reactant flow fields. The outermost columns 40 correspond to one-half of the central columns 30 and fit against the side walls 42 of the plenum chamber 10. From this description it will be seen that each primary nozzle 12 is a two-dimensional nozzle of the kind described earlier and having a diverging nozzle portion or passage bounded by only two confronting diverging walls, i.e. walls 36. The nozzle expansion plane is normal to the walls 36 parallel to the plane of the paper in FIG. 4. The primary reactant flow field passing through each primary nozzle undergoes essentially two dimensional expansion, wherein substantially all expansion of the field occurs in directions parallel to this plane.

The primary novelty of the present invention resides in the construction, arrangement, and operation of the secondary reactant injection system 16 for efficiently injecting the secondary reactant gas into the expanding primary reactant flow fields emerging from the primary nozzles 12. This injection system will now be described by reference to FIGS. 2–6. The injection system 16 includes a plurality of reactant feed tubes 44 parallel to and secured to the front surfaces 46 of the columns 30 and end columns 40. Two of these feed tubes are positioned between each pair of adjacent primary nozzles 12. Feed tubes 44 have curved lower ends 50 connected to a reactant supply manifold 48. A secondary reactant such as hydrogen or deuterium gas, is supplied to the manifold 48 under pressure through an input tube 52.

The hypersonic secondary injection vanes 54 extend lengthwise between pairs of adjacent feed tubes 44 and across the exit openings of the respective intervening primary nozzles 12 substantially parallel to or at a small angle to the nozzle expansion plane. These hypersonic vanes are made as thin as possible and aerodynamically shaped to minimize their drag effect on the flow fields from the primary nozzles. The illustrated wedge shape is preferred for hypersonic flow. For the reactants used, a spacing of approximately 0.150" between adjacent wedge nozzles at their regions of closest approach provides maximum efficiency of mixing. Vanes 54 are spaced vertically along the full length of the primary nozzles 12. Each secondary vane 54 has an upstream or leading knife edge 56 and a broader downstream or trailing edge containing a row of secondary injection orifice or nozzle openings 58.

Considering the operation of the laser as described to this point, primary reactant gas produced within the plenum 10 exits through the several primary nozzles 12 and flows between the hypersonic secondary injection vanes 54 into the optical cavity 14. The primary reactant flow field emerging from each primary nozzle undergoes essentially two-dimensional expansion in directions parallel to the nozzle flow field expansion plane (i.e. parallel to the plane of the paper in FIG. 4). This two-dimensional flow field expansion is represented by the arrow A in FIG. 6.

The secondary reactant is injected into the two-dimensionally expanding primary reactant flow field emerging from each primary nozzle 12 through the trailing edge nozzle openings or orifices 58 in the corresponding hypersonic secondary injection vanes 54. These secondary nozzle openings discharge the secondary reactant into the summary reactant flow field to mix the reactants predominantly by molecular diffusion of the secondary reaction into the primary reactant flow field in directions transverse to the vane length, as indicated by the arrow B in FIG. 6.

It will now be understood that during operation of the illustrated laser, mixing of the primary and secondary reactants occurs within the laser optical cavity 14 by molecular diffusion of the secondary reactant from the secondary injection vanes 54 into the expanding primary reactant flow fields passing across opposite sides of these vanes. This molecular diffusion of the secondary reactant occurs in directions or along an axis (mixing axis) represented by the arrow B in FIG. 6, transverse and approximately perpendicular to the direction or axis (expansion axis) of free expansion of the primary reactant flow fields represented by the arrow A in FIG. 6. As a consequence, the primary flow fields have virtually no component of expansion in the direction of secondary reactant molecular diffusion. Mixing of the secondary reactant in the flow fields of the primary reactant is thus accelerated and the primary flow field path length over which mixing occurs is shortened. The concentration of the vibrationally excited molecules within the lasing cavity 14 is thereby substantially increased. At the same time gas dynamic flow expansion effects permit high Mach number flows to be achieved. This feature of the invention is critical to obtaining higher efficiency in the chemical laser. By orienting the diffusion mixing direction B substantially ninety degrees relative to the direction A of expansion of the emerging primary reactant gases from the primary nozzles, as described, it is possible to create a chemical laser which operates supersonically at higher mass and molar efficiencies than has heretofore been achieved. In addition, the chemical laser design of the present invention reduces the thermal loads to the components, the viscous drag losses in the flow, the diluent requirements and the pressure forces on the critical components, while permitting a more economical construction.

As best seen in FIG. 3, the secondary injection vanes 54 are preferably canted slightly (angle $\theta$ in FIG. 3) relative to the nozzle expansion plane and the optical axis 22 by an angle, for example, of five degrees. This slight canting of the secondary vanes relative to the optical axis minimizes the effect of optical disturbances in the optical cavity where the lasing action takes place. The optical disturbances are the result of the striated regions of optimum gain resulting from the mixing zones formed by the individual secondary nozzle openings 58.

While a preferred embodiment of the invention has been described in detail, various modifications are possible to the structure without departing from the basic concept. For example, several stages of secondary injection vanes may be used to introduce more than one secondary reactant into the primary reactant flow fields. The optical axis 22 is located in and may be oriented at different angles within a plane downstream of the secondary vanes where optimum mixing is achieved. The secondary nozzle openings 58 may be simple subsonic orifices or may be shaped to form supersonic nozzles.

What we claim is:

1. Apparatus for mixing first and second reactants in a chemical laser, comprising:
   primary nozzle means for expanding said first reactant to produce an expanding reactant flow field whose free expansion is essentially two dimensional in character and occurs predominantly in directions parallel to a given expansion plane parallel to the flow path of the flow field; and
   secondary injection means for mixing said second reactant with said first reactant predominantly by molecular diffusion of the second reactant into said first reactant flow field in transverse directions of said flow field expansion plane.

2. The mixing apparatus of claim 1 wherein:
   said secondary injection means comprise spaced vanes extending across said flow field path in generally parallel relation to said expansion plane, and secondary nozzle openings in said vanes through which said secondary reactant is injected into said flow field.

3. The mixing apparatus of claim 2 wherein:
said vanes have a hypersonic wedge-shape in transverse cross-section.

4. The mixing apparatus of claim 3 wherein:
said vanes are canted at a small angle relative to said expansion plane.

5. The mixing apparatus of claim 1 wherein:
said primary nozzle means comprises at least one two-dimensional primary nozzle with a divergent flow passage bounded essentially by two opposing divergent walls normal to said expansion plane, and
said secondary injection means comprises spaced secondary injection vanes extending across the exit end of each primary nozzle in generally parallel relation to said expansion plane, and secondary nozzle openings in said vanes through which said secondary reactant is injected into the reactant flow field from the corresponding primary nozzle.

6. The mixing apparatus of claim 5 wherein:
said primary nozzle means comprises a plurality of said primary nozzles disposed side by side and having a common expansion plane.

7. The mixing apparatus of claim 5 wherein:
said secondary injection vanes extend lengthwise at a slight angle to said planes.

8. The mixing apparatus of claim 5 wherein:
said secondary nozzle openings are located along the trailing edges of said secondary injection vanes relative to the direction of flow field movement past the vanes.

9. The mixing apparatus of claim 8 wherein:
said secondary injection vanes have a hypersonic wedge shape in transverse cross-section.

10. The mixing apparatus of claim 1 wherein:
said secondary injection means comprise rows of spaced nozzle openings through which said second reactant is injected into said flow field, and
said rows extend across said flow path in generally parallel relation to said expansion plane.

11. A chemical laser comprising:
a plenum chamber in which a first gaseous reactant is generated,
an optical cavity having an optical axis,
primary nozzle means communicating said plenum chamber and optical cavity for expanding said first reactant through said optical cavity along a flow path transverse to said optical axis to produce within said cavity an expanding reactant flow field whose free expansion is essentially two dimensional in character and occurs predominantly in directions parallel to a given expansion plane parallel to said flow path, and
secondary injection means for mixing a second reactant with said first reactant predominantly by molecular diffusion of the second reactant into said flow field in directions transverse to said expansion plane and resultant lasing in said optical cavity.

12. The chemical laser of claim 11 wherein:
said secondary injection means comprise spaced vanes extending across said flow field path in generally parallel relation to said expansion plane, and secondary nozzle openings in said vanes through which said secondary reactant is injected into said flow field.

13. The chemical laser of claim 12 wherein:
said vanes have a hypersonic wedge shape in transverse cross-section.

14. The chemical laser of claim 11 wherein:
said primary nozzle means comprises at least one two-dimensional primary nozzle with a divergent flow passage bounded essentially by two opposing divergent walls normal to said expansion plane, and
said secondary injection means comprises spaced secondary injection vanes extending across the exit end of said primary nozzle in generally parallel relation to said expansion plane, and secondary nozzle openings in said vanes through which said secondary reactant is injected into the reactant flow field from the corresponding primary nozzle.

15. The chemical laser of claim 14 wherein:
said primary nozzle means comprises a plurality of said primary nozzles disposed side by side and having a common expansion plane.

16. The chemical laser of claim 14 wherein:
said secondary injection vanes extend lengthwise at a slight angle relative to said optical axis.

17. The chemical laser of claim 14 wherein:
said secondary injection vanes have a hypersonic wedge shape in transverse cross-section; and said secondary nozzle openings are located along the trailing edges of said vanes.

18. The chemical laser of claim 11 wherein:
said secondary injection means comprise rows of spaced nozzle openings through which said second reactant is injected into said flow field, and
said rows extend across said flow path in generally parallel relation to said expansion plane.

19. The method of mixing first and second reactants in a chemical laser, comprising the steps of:
expanding said first reactant through first nozzle means to produce an expanding reactant flow field whose free expansion is essentially two dimensional in character and occurs predominantly in directions parallel to a given expansion plane parallel to the flow path of the flow field; and
mixing said second reactant with said first reactant predominantly by molecular diffusion of the second reactant into said first reactant flow field in transverse directions of said flow field expansion plane.

20. The mixing method of claim 19 wherein:
said second reactant is injected into said flow field through nozzle openings in spaced hypersonic vanes extending across said flow field in generally parallel relation to said expansion plane.

21. The method of operating a chemical laser, comprising the steps of:
expanding a first reactant through first nozzle means through an optical lasing cavity having an optical axis and along a flow path transverse to said axis to produce in said cavity an expanding reactant flow field whose free expansion is essentially two dimensional in character and occurs predominantly in directions parallel to a given expansion plane parallel to said flow path;
mixing a second reactant with said first reactant predominantly by molecular diffusion of the second reactant into said first reactant flow field in transverse directions of said flow field expansion plane.

22. The method of claim 21 wherein:
said second reactant is injected into said flow field through rows of spaced nozzle openings extending across said flow field in generally parallel relation to said expansion plane.

23. The method of claim 22 wherein:
said rows of nozzle openings are included at a slight angle to said optical axis.

* * * * *